(12) United States Patent
Witzens et al.

(10) Patent No.: US 9,036,953 B2
(45) Date of Patent: May 19, 2015

(54) ELECTRO-OPTICAL MODULATOR BASED ON CARRIER DEPLETION OR CARRIER ACCUMULATION IN SEMICONDUCTORS WITH ADVANCED ELECTRODE CONFIGURATION

(71) Applicant: RWTH Aachen University, Aachen (DE)

(72) Inventors: Jeremy Witzens, Cologne (DE); Florian Merget, Wuerselen (DE)

(73) Assignee: RWTH AACHEN UNIVERSITY, Aachen (DE)

( * ) Notice: Subject to any disclaimer, the term of this patent is extended or adjusted under 35 U.S.C. 154(b) by 201 days.

(21) Appl. No.: 13/784,553

(22) Filed: Mar. 4, 2013

(65) Prior Publication Data
US 2014/0248019 A1  Sep. 4, 2014

(51) Int. Cl.
| | |
|---|---|
| G02F 1/01 | (2006.01) |
| G02B 6/00 | (2006.01) |
| G02F 1/225 | (2006.01) |
| G02F 1/025 | (2006.01) |
| G02F 1/015 | (2006.01) |

(52) U.S. Cl.
CPC ............. *G02F 1/2255* (2013.01); *G02F 1/025* (2013.01); *G02F 1/0121* (2013.01); *G02F 1/2257* (2013.01); *G02F 2001/0152* (2013.01)

(58) Field of Classification Search
CPC ..... G02F 1/0121; G02F 1/025; G02F 1/2255; G02F 1/2257; G02F 2001/0152
USPC ................................ 385/1–10, 142
See application file for complete search history.

(56) References Cited

PUBLICATIONS

Baehr-Jones et al., "Ultralow Drive Voltage Silicon Traveling-Wave Modulator", Optics Express 20:11:12014-12020 (May 11, 2012).
Liu et al., "High-Speed Optical Modulation Based on Carrier Depletion in a Silicon Waveguide", Optical Society of America (2007).
Witzens et al., "Design of Transmission Line Driven Slot Waveguide Mach-Zehnder Interferometers and Application to Analog Optical Links", Optics Express 18:16:16902-16928 (Jul. 26, 2010).
Witzens, Jeremy, "Integrated Photonics, OTK1: Optical Telecommunications I: Devices: Lesson 10: Modulators", Rheinisch-Westfalische Technische Hochschule Aachen (2012).
Wooten, et al., "A Review of Lithium Niobate Modulators for Fiber-Optic Communications Systems", IEEE Journal of Selected Topics in Quantum Electronics 6:1:69-82 (Jan./Feb. 2000).

*Primary Examiner* — Akm Enayet Ullah
*Assistant Examiner* — Michael Mooney
(74) *Attorney, Agent, or Firm* — Birch, Stewart, Kolasch & Birch, LLP

(57) ABSTRACT

An electro-optical modulator with two electrodes as part of a transmission line of a first phase modulator and two electrodes as part of a transmission line of a second phase modulator included in two arms of a Mach-Zehnder-interferometer. An electrical controller applies a first electrical high-frequency-modulated voltage signals between the first and second electrodes and applies a second electrical high-frequency-modulated signals between the fourth and third electrodes. The electrical controller applies signals such that voltages applied to the first and fourth electrodes have substantially a same high-frequency content, and voltages applied to the second and third electrodes have substantially the same high-frequency content. In such configuration, a constant voltage offset is produced by either the voltages applied to the first and fourth electrodes or, the second and third electrodes. Thereby, cross-talk between electrodes, electrical losses, device size and fabrication costs may be reduced.

18 Claims, 4 Drawing Sheets

ELECTRO-OPTICAL MODULATOR BASED ON CARRIER DEPLETION OR CARRIER ACCUMULATION IN SEMICONDUCTORS WITH ADVANCED ELECTRODE CONFIGURATION

FIELD OF THE INVENTION

The present invention relates to an electro-optical modulator based on carrier depletion or carrier accumulation in pn-diodes or in semiconductor-insulator-semiconductor capacitors.

BACKGROUND OF THE INVENTION

An electro-optical modulator may be used for converting electrical signals into optical signals. Therein, analogue or digital electrical signals may be input to the electro-optical modulator and the electro-optical modulator may then output corresponding optical signals. The optical signals in a form of amplitude or phase modulated light may then e.g. be transmitted through optical fibres. In order to enable data transmission at e.g. more than one gigabit per second (Gbps), the electro-optical modulator should be able to convert signals in a radiofrequency (RF) range.

Various types of electro-optical modulators have been proposed. High data transmission rates have been realized with a depletion type plasma modulator with pn-diodes as well as with an accumulation type plasma modulator with semiconductor-insulator-semiconductor capacitors, based on a Mach-Zehnder interferometer (MZI) architecture in push-pull configuration.

However, conventional electro-optical modulators of that type may suffer from cross-talk between neighbouring signal lines in the push-pull configuration. Furthermore, in order to e.g. limit such cross-talk, such electro-optical modulators may need significant space so as to provide sufficient distance between the signal lines, thereby reducing a possible on-chip device density when a plurality of modulators is to be integrated within a single chip. Additionally, insufficient electro-magnetic shielding provisions may result in signal losses in transmission lines of the electro-optical modulator. And, last but not least, complex electro-magnetic shielding provisions and high data transmission requirements may result in high fabrication costs.

SUMMARY OF THE INVENTION

There may therefore be a need for an electro-optical modulator having at least one of reduced cross-talk between the signal lines, a compact geometry and thus a high on-chip device density when more than one modulator is implemented, reduced transmission line losses resulting from efficient shielding and low cost device fabrication.

Such need may be met with an electro-optical modulator as defined in the independent claim. Advantageous embodiments are defined in the dependent claims.

According to an aspect of the present invention, an electro-optical modulator for generating output high-frequency optical signals based on input high-frequency electrical signals is proposed. The electro-optical modulator comprises a first electrode, a second electrode, a third electrode, and a fourth electrode. The electro-optical modulator further comprises a first semiconductor arrangement and second semiconductor arrangement. The first semiconductor arrangement includes one of a first pn-diode and a first semiconductor-insulator-semiconductor capacitor and has an anode electrically connected to the first electrode and has a cathode electrically connected to the second electrode and forms a first optical waveguide comprising one of a first pn-junction of the first pn-diode and a first semiconductor-insulator interface of the first semiconductor-insulator-semiconductor capacitor, respectively. The second semiconductor arrangement includes one of a second pn-diode and a second semiconductor-insulator-semiconductor capacitor and has an anode electrically connected to the third electrode and has a cathode electrically connected to the fourth electrode and forms a second optical waveguide comprising one of a second pn-junction of the second pn-diode and a second semiconductor-insulator interface of the second semiconductor-insulator-semiconductor capacitor, respectively. The electro-optical modulator further comprises an electrical controller adapted for applying a first voltage $V_1$ to the first electrode and a second voltage $V_2$ to the second electrode for generating a first electrical high-frequency-modulated voltage signal $Sig1(t)$ between the first and the second electrode and for applying a third voltage $V_3$ to the third electrode and a fourth voltage $V_4$ to the fourth electrode for generating a second electrical high-frequency-modulated signal $Sig2(t)$ between the fourth and third electrode. Therein, a high-frequency content of each one of the voltages $V_1, V_2, V_3, V_4$ applied to one of the electrodes corresponds to Fourier components with frequencies above 1 GHz. Furthermore, voltages $V_1, V_4$ applied to the first and fourth electrodes for applying the first and second electrical high-frequency-modulated voltage signals $Sig1(t), Sig2(t)$ have substantially a same high-frequency content, and the voltages $V_2, V_3$ applied to the second and third electrodes for applying the first and second electrical high-frequency-modulated voltage signals $Sig1(t), Sig2(t)$ have substantially a same high-frequency content. Finally, the voltages applied to the first and fourth electrodes for applying the first and second electrical high-frequency-modulated voltage signals $Sig1(t), Sig2(t)$ differ by a first voltage offset $V_{offset1}$ with $V_{offset1} = V_{offset1,const} + V_{diff1}$ with $V_{offset1,const}$ being constant and non-zero and $|V_{diff1}| < 0.5V$, and/or the voltages applied to the second and third electrodes for applying the first and second electrical high-frequency-modulated voltage signals $Sig1(t), Sig2(t)$ differ by a second voltage offset $V_{offset2}$ with $V_{offset2} = V_{offset2,const} + V_{diff2}$ with $V_{offset2,const}$ being constant and non-zero and $|V_{diff2}| < 0.5V$.

It should be pointed out that possible features and advantages of embodiments of the invention are described herein in relation to various details of the proposed electro-optical modulator such as its electrode configuration, an implemented signal current flow scheme with electrode extensions or an architecture of integrated pn-diodes. A person skilled in the art will recognise that the various features may be combined or replaced in order to create further embodiments of the proposed electro-optical modulator and to possibly obtain synergy effects.

BRIEF DESCRIPTION OF THE DRAWINGS

Possible aspects, features and advantages of embodiments of the present invention are apparent from the following description of specific embodiments with reference to the enclosed drawings, wherein said description and drawings are not to be interpreted as restricting the invention.

The drawings are merely schematic and are not true to scale.

DESCRIPTION OF PREFERRED EMBODIMENTS OF THE INVENTION

Introduction

Electro-optical modulators are one of the key components of photonic data transmission systems such as active optical cable transmitters, datacom transmitters or complex quadrature phase shift type transmitters in Metro-Access and Long-Haul telecom networks.

Figure 1:
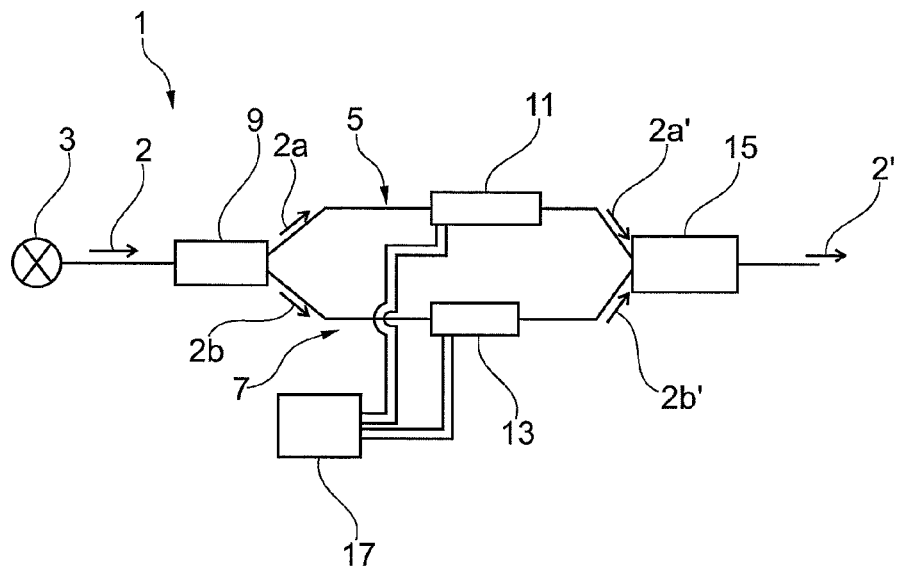
FIG. 1 shows an exemplary electro-optical modulator.

Embodiments of the invention are generally built on a state-of-the-art depletion type or accumulation type plasma electro-optical modulator 1 based on a Mach-Zehnder interferometer (MZI) architecture in push-pull configuration as schematically depicted in FIG. 1.

The MZI may be implemented as a waveguide based device that splits incoming light 2 coming from a light source 3 into two modulator-arms 5, 7 using a light splitting device 9 such as a Y-junction splitter (YS), a directional coupler splitter (DCS) or a multimode-interferometer (MMI). In both of the modulator-arms 5, 7 an electrically driven phase modulator 11, 13 is implemented that is adapted to tune the phase velocity of the propagating light 2a, 2b and thus the phase of the mode of the light 2a', 2b' at the end of the modulator-arms 5, 7. At the output of the MZI, the light 2a', 2b' propagating in the two modulator-arms 5, 7 is recombined in a light recombination and interference device 15, resulting in light 2' due to an interference that converts phase modulation into amplitude modulation. Depending on the phase relation of the two optical modes of light 2a', 2b' in the first and second modulator-arms 5, 7, they will interfere constructively or destructively, resulting respectively in e.g. a light intensity maximum or minimum at the output of the MZI. This may result in amplitude modulation of the light 2' at the output of the MZI directly correlated to electrical control signals applied by a control device 17 to the first and second electrically driven phase modulators 11, 13.

When a directional coupler splitter (DCS) is used as light recombination and interference device 15 both an amplitude modulated optical signal (So), as well as an inverted (or complementary) optical signal ($\overline{So}$) may be generated and further utilized at the output of the MZI.

An MZI may also be used as a phase modulator in conjunction to amplitude modulation if a balanced phase modulation is applied in addition to the push-pull signal.

Figure 4:
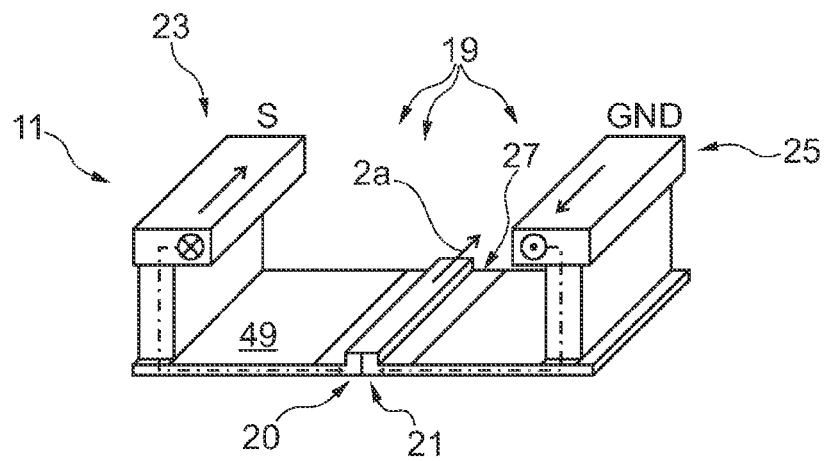
FIG. 4 shows a transmission line geometry for an electro-optical modulator.

As described in further detail below and as schematically depicted in FIG. 4, the electrically driven phase modulators 11, 13 each may be advantageously implemented with a transmission line 19 including a reverse-biased pn-diode 20, utilizing the free-carrier dispersion effect to convert electrical signals provided by the control device 17 into a phase shift of a mode of light 2a', 2b'. Therein, a waveguide 27 has a suitable geometry for guiding light 2a along a core of the waveguide 27 extending along or otherwise comprising a pn-junction 21 of a pn diode 20. Another configuration in which the core of the waveguide 27 may comprise a pn junction 21 may consist in the pn junction to be perpendicular to the main axis of the waveguide and crossing the core of the waveguide.

Instead of using a pn diode 20, a MOS-type capacitor, also referred to as a semiconductor-insulator-semiconductor capacitor, constituted out of p-doped and an n-doped semiconductor regions, separated by an insulator layer, may also be used.

In this application, semiconductor-insulator-semiconductor capacitors may be constituted out of a p-doped semiconductor on one side of the insulator and out of an n-doped semiconductor on the other side of the insulator, thus forming two semiconductor-insulator junctions. In analogy to the pn diode, the p-type semiconductor of the semiconductor-insulator-semiconductor capacitors are referred to as the anode and the n-type semiconductor of the semiconductor-insulator-semiconductor capacitors are referred to as the cathode. In analogy to a pn diode, forward biasing of a semiconductor-insulator-semiconductor capacitor corresponds to a situation where the anode is set to a higher voltage than the cathode. Forward biasing of a semiconductor-insulator-semiconductor capacitor may result in carrier accumulation in the semiconductor-insulator-semiconductor capacitor.

While pn diode based phase shifters (phase modulators) are typically primarily operated in reverse bias in order to prevent minority carrier injection, and thus slow device operation, semiconductor-insulator-semiconductor structures may also be operated in accumulation regime corresponding to a higher voltage applied to the p-side (anode) than to the n-side (cathode). As for the pn junction 21, a semiconductor-isolator interface of the semiconductor-isolator-semiconductor capacitor is preferentially at least partially located within the core of the waveguide 27.

In order to guide light, a waveguide typically needs to be constituted at least by a core region, and by a cladding region surrounding the core. In order to confine light inside the waveguide, the core region has a higher refractive index than the cladding, or in the case of a waveguide partially etched into a thin film or a stack of thin films, a higher effective index than the cladding. A partially etched waveguide is also called a strip-loaded or a ridge waveguide. It is typically formed by partially etching a thin film or a stack of thin films on both sides of the core. The core of the waveguide may then be the center region of the partially etched film or stack of thin films that remains un-etched or etched to a lower extent than the cladding regions on either side of the core. The partially etched film or stack of thin films may also be surrounded by regions with a lower refractive index above and below the thin film or stack of thin films. These lower refractive index regions are also part of the cladding of the waveguide. Laterally, i.e. along the direction of the film in a waveguide cross-section, the ridge of the waveguide may coincide with the region of the waveguide core. The film or stack of thin films in which a ridge waveguide is defined by partial etching may also be referred to as the slab of the ridge waveguide.

Ridge waveguides are typically used in depletion type or accumulation type electro-optical modulators by partially etching a semiconductor film or a stack of thin films comprising a semiconductor film. The partially etched semiconductor film may allow electrical connectivity to a pn junction 21 or to a semiconductor-isolator junction of a semiconductor-isolator-semiconductor capacitor at least partially located within the core of the waveguide. Such waveguides are exemplarily shown in FIGS. 4, 5 and 7. Placing a pn junction within the core of the waveguide, or placing a semiconductor-isolator junction of a semiconductor-isolator-semiconductor capacitor within the core of the waveguide may be advantageous since it may result in a high overlap between an optical field and the junction. This may be due to the fact that most of the optical field (i.e. light) of a mode guided by the waveguide may be located within the core of the waveguide.

Figure 6:
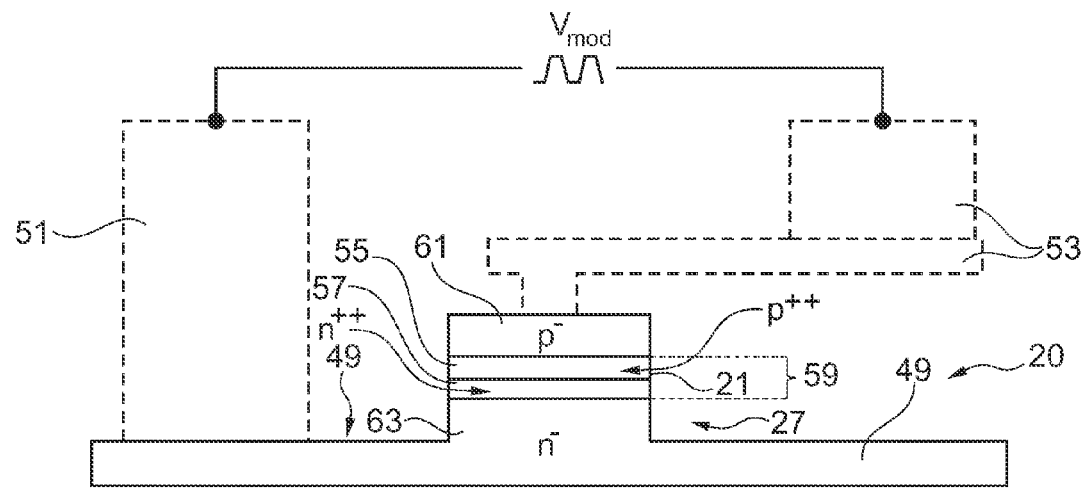
FIG. 6 shows a pn diode architecture usable in an electro-optical modulator according to a specific embodiment of the present invention.

One or both electrical terminals of a waveguide may also be electrically contacted through the top of the waveguide as shown exemplarily in FIG. 6. Here too, the core of the waveguide may be defined as the center region of the waveguide corresponding to the un-etched or etched to a lower extent portion of the film or stack of thin films, but also includes the portion of the top electrical contact located immediately above the center region if this contact is made out of a material with a substantially higher refractive index than the cladding materials located below the partially etched film or stack of thin films and above the top contacting material.

A typical way of fabricating a partially etched waveguide is to start with a thin silicon film on silicon dioxide, for example as provided by a silicon-on-insulator (SOI) wafer, and to partially etch into said silicon film. A top contacting material may be made out of amorphous silicon, out of polycrystalline silicon or out of mono-crystalline silicon, e.g. formed by recrystallizing amorphous or polycrystalline silicon. In these cases, a portion of the contacting material located immediately above the ridge may be part of the core of the waveguide.

An electrical transmission line 19 is typically used to transmit an electrical signal S from the control device 17 to a pn-diode 20 or to a semiconductor-insulator-semiconductor capacitor of an electrically driven phase modulator 11. A transmission line is typically referred to as a specialized cable or conductor arrangement designed to carry alternating currents of radio frequency, that is, currents with a frequency at a rate of oscillation in the range of about 3 kHz to 300 GHz, such frequency being high enough that the wave nature of the electrical currents must be taken into account. The wave nature of the electrical currents must for example be taken into account if the length of an electrode is longer than 25% of the wavelength of the RF wave in the structure. Since the wavelength of the RF waves in the transmission lines considered here are typically between $1/5^{th}$ and $1/3^{rd}$ of the free-space wavelength, this typically corresponds to electrodes that are longer than $1/20^{th}$ to $1/12^{th}$ of the free space wavelength. For typical dimensions of electro-optical modulators, the latter applies for RF frequencies of 1 GHz and above. As shown in FIG. 4, a transmission line 19 typically includes two longitudinal electrodes 23, 25 separated from each other by a specific gap and connected to a semiconductor region 49 including a pn diode 20 with a pn junction 21 e.g. extending along the waveguide 27 or at least partially contained within the waveguide 27, or including a semiconductor-insulator-semiconductor capacitor with a semiconductor-isolator junction extending along or at least partially contained within the waveguide 27. The semiconductor region 49 may for example be a semiconductor substrate or the device layer film of a silicon-on-insulator (SOI) wafer. The entire modulator may be fabricated on a substrate such as a semiconductor wafer or a semiconductor chip.

The transmission line 19 of an electrically driven phase modulator 11 is typically designed to achieve phase matching, i.e., the speed of an electrical signal in the transmission line 19 is closely matched to the speed at which wave packets of light 2a propagate in the connected waveguide 27, i.e. the group velocity of the light. They are also typically designed to obtain a targeted impedance.

Conventional modulator architectures are usually based on co-planar transmission line designs in which both electrodes 23, 25 are fabricated in a same metal layer and are respectively located on both sides of the waveguide 27 adapted for guiding a mode of light 2a and containing at least part of a pn junction 21 of a reverse-biased pn diode 20 or containing at least part of an insulator-semiconductor junction of a semiconductor-insulator-semiconductor capacitor. In order to allow for the definition of a pn junction 21 or of a semiconductor-insulator junction, the waveguide 27 is at least partially fabricated out of a semiconductor such as silicon, germanium, an InAlGaAs alloy or an InGaAsP alloy. One electrode 23 is used as a signal line to apply a radio frequency modulated voltage signal S to one of an anode or a cathode of the pn diode 20 or of a semiconductor-insulator-semiconductor capacitor, while the other electrode 25 may serve as a ground-line (GND) connected to the other of the anode or the cathode of the pn diode 20 or the semiconductor-insulator-semiconductor capacitor.

Here and elsewhere in this invention description, the term semiconductor may not be restricted to the single crystalline form of these materials, but also includes their polycrystalline or amorphous forms.

In a conventional push-pull design in which an electrically driven phase modulator 11, 13 is integrated in each of the two modulator-arms 5, 7 of the electro-optical modulator 1, a first signal (S) is applied at the electrode 23 of a first electrically driven phase modulator 11 and an inverse signal ($\bar{S}$) is applied at the electrode 23 of a second electrically driven phase modulator 13.

Typically, in conventional push-pull architectures the $\bar{S}$-signal is generated by inverting the S-signal, i.e., if the S-signal-line carries a logical 1 the $\bar{S}$-signal-line carries a logical 0 and vice versa. A logical 1 is usually associated with a positive voltage relative to ground (GND), whereas a logical 0 is usually associated with zero voltage. Thus, to ensure reverse biasing of pn-diodes in a conventional push-pull-architecture the signal-electrode S and $\bar{S}$ are connected to the cathode of the pn-diodes, i.e. the n-side of the pn junction, while the anode, i.e. the p-side of the pn junction is connected to the GND-electrode(s), as shown exemplarily in FIG. 4.

In such conventional push-pull architecture, the signal electrode 23 for the data bit pattern (S) and for the inverted (or complementary) bit pattern ($\bar{S}$) are typically shielded by adjacent GND-electrodes 25 that also act as a return path for the signal. Typically, the signal electrodes 23 for the signals S and $\bar{S}$ are separated from each other by a considerable distance to prevent cross-talk.

Since S and $\bar{S}$ are inverted bit patterns, they typically also have opposite, and thus different, high frequency content. The same holds for an electro-optical modulator based on phase shifters implemented with semiconductor-insulator-semiconductor capacitors, with the only difference that the polarity (orientation) of both semiconductor-insulator-semiconductor capacitors may be swapped in order to operate them primarily in forward bias.

Depending on a complexity of a back-end-of-line process and a number of metal layers devoted to the high-frequency signal network, the shielding may be realized by a simple in plane shielding, i.e., GND electrodes 25 may be fabricated in the same metal-layer as the signal electrodes 23. Alternatively, in a more complex back-end process, a full shielding scheme with GND-planes fabricated in additional metal-layers above and below the signal electrodes may be implemented.

For in-plane shielding, two different implementations may be realized.

Figure 2A:
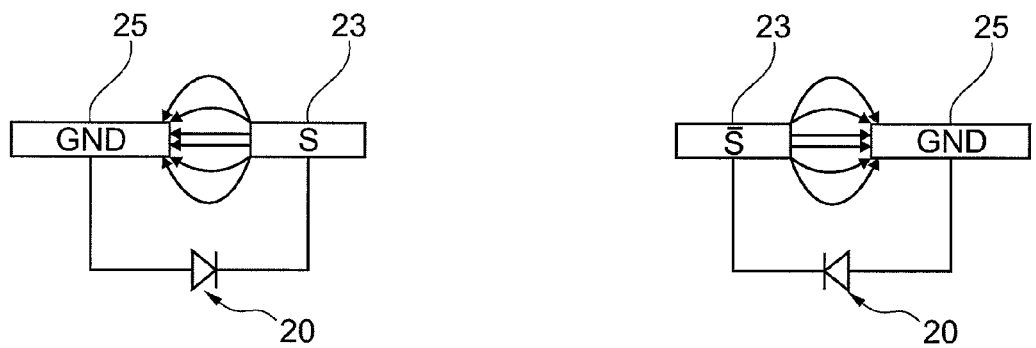
FIGS. 2a, 2b show examples of electrode structures and their electrical connectivity to integrated pn diodes in conventional electro-optical modulators.

In a first alternative as shown in FIG. 2a, each signal-electrode 23 is shielded by just one GND-electrode 25 resulting in a GS$\overline{\text{S}}$G-configuration. However, if S- and $\overline{\text{S}}$-signal-electrodes 23 are well separated in order to suppress cross-talk between the S and S electrodes, an RF-mode is not well confined and may be easily perturbed by surrounding materials, especially the substrate or packaging. In general and especially at high RF-frequencies this may cause high RF losses. If the two signal electrodes 23 are close together, the RF-modes are strongly coupled, resulting in super-modes with different propagation velocities. This results in a better confinement of the RF field. However, when transporting an arbitrary bit stream, more than one type of super-modes is generally generated. A difference in propagation velocity of two super-modes generally prevents them from both being phase matched to the group velocity of the waveguide. This typically limits the bandwidth of the electro-optical modulator 1.

Figure 2B:
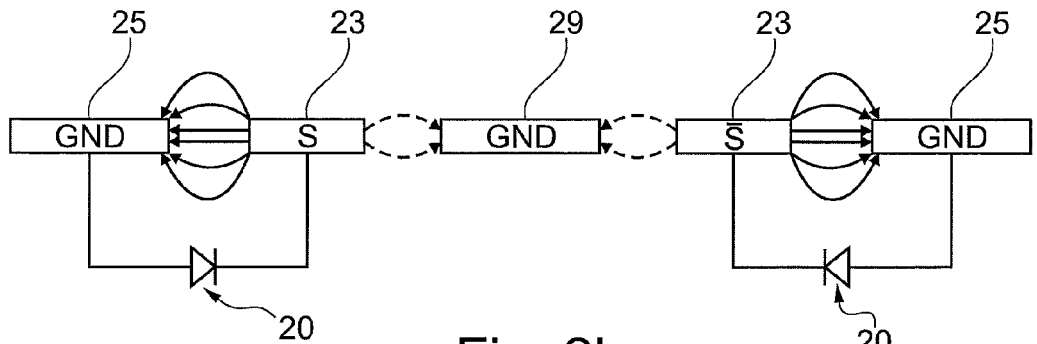

In a second alternative as shown in FIG. 2b, an additional separating GND-electrode 29 is implemented between the two signal-electrodes 23, both to confine the RF-fields as well as to effectively shield the RF-modes from one another, resulting in a GSG$\overline{\text{S}}$G-configuration. Here, two RF-modes propagating in the GSG transmission line and in the G$\overline{\text{S}}$G transmission line are independent from one another and may be designed and phase matched independently. However, problems may arise due to the fact that the transmission lines are in general very asymmetrically capacitively loaded by the pn-junction or MOS-type capacitor between the signal electrode 23 and just one of the GND-electrodes 25, while the other GND-electrode 29 is not capacitively loaded. This again results in different RF-wave propagation velocities for either type of loading and may limit the bandwidth of the modulator. Alternatively, the ground electrodes may be shorted to each other, but this generally requires a more complex back-end process with at least two metallization layers.

Thus, with the above-mentioned alternatives for electrical transmission line configuration, in order to reach highest possible data rates a costly and technologically demanding full shielding may be necessary to avoid cross-talk between the signal lines.

Advanced Electrical Transmission Line Configuration

According to main embodiments of the present invention, an improved alternative for electrical transmission line configuration is proposed. Possible features and advantages of an advanced electrode configuration applied in such electrical transmission line configuration will be explained in the following in more detail.

One of the key limiting factors of depletion type or accumulation type plasma modulators are RF-losses and electrical cross-talk inherent to the conventional transmission line design in the push-pull architecture.

The co-propagation of the two super-modes necessary in the conventional push-pull architecture of a GS$\overline{\text{S}}$G-transmission line configuration may pose a significant design limitation and typically causes a high degree of cross-talk between the signal lines, especially at high data rates.

Aspects of the invention consist in a novel transmission line configuration and driving scheme that, in an ideal case, may completely remove cross-talk and may allow driving the entire push-pull architecture with a single RF-mode, while at the same time maintaining a geometry that is compatible with a single metallization layer, possibly with an optional via layer in between the metallization layer and the semiconductor region 49. This configuration also allows a very compact device by removing a necessity of adding a ground plane or of allowing for substantial spacing between the two GS transmission lines.

Figure 3:
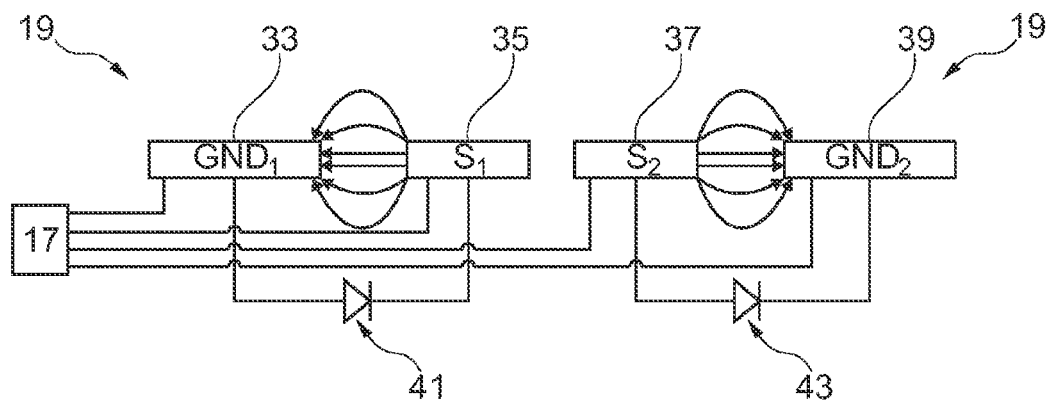
FIG. 3 shows an electrode structure and its electrical connectivity to integrated pn diodes in an electro-optical modulator according to an embodiment of the present invention.

As depicted in the embodiments of the invention shown in FIGS. 1 and 3 an electro-optical modulator 1 for generating output high-frequency optical signals 2' based on input high-frequency electrical signals may comprise a first electrode 33, a second electrode 35, a third electrode 37 and a fourth electrode 39, wherein two electrodes 33, 35 are part of a transmission line 19 of a first phase modulator 11 and further two electrodes 37, 39 are part of a transmission line 19 of a second phase modulator 13 included in arms 5, 7 of a Mach-Zehnder-interferometer.

As depicted in FIG. 3 and furthermore similar to the transmission line 19 shown in FIG. 4, the modulator 1 and its electrode configuration further comprise a first semiconductor arrangement with a semiconductor region 49 including a first pn-diode 41, 20, or a first semiconductor-insulator-semiconductor capacitor, having an anode electrically connected to the first electrode 33 and having a cathode electrically connected to the second electrode 35 and forming a first optical waveguide 27 extending along or comprising at least part of a first pn-junction 21 or of a first semiconductor-insulator junction of the first semiconductor-insulator-semiconductor capacitor. Similarly, the modulator 1 and its electrode configuration further comprise a second semiconductor arrangement including a second pn-diode 43, 20 or a second semiconductor-insulator-semiconductor capacitor having an anode electrically connected to the third electrode 37 and having a cathode electrically connected to the fourth electrode 39 and forming a second optical waveguide extending along or comprising at least part of a second pn-junction or of a second semiconductor-insulator junction of a second semiconductor-insulator-semiconductor capacitor.

In a preferred embodiment the first, second, third and fourth electrodes are arranged adjacent to each other on the substrate, in that order. In a further preferred embodiment, the first waveguide is further located in between the first and second electrodes and the second waveguide is located in between the third and fourth electrodes.

The electro-optical modulator further comprises an electrical controller 17 adapted for applying first electrical high-frequency-modulated voltage signals Sig1(t) between the first and the second electrodes 33, 35 and for applying second electrical high-frequency-modulated signals Sig2(t) between the fourth and third electrodes 39, 37.

However, a DC component of these signals Sig1(t) and Sig2(t) and a polarity with which these signals are applied to the first and second diodes 41, 43 or a polarity with which these signals are applied to the first and second semiconductor-insulator-semiconductor capacitors principally differ in comparison to the above described cases of a GS$\overline{\text{S}}$G-configuration or a GSG$\overline{\text{S}}$G-configuration.

When a high-frequency content of a voltage applied to one of the four electrodes 33, 35, 37, 39 is defined to correspond to Fourier components with frequencies above 1 GHz, the electrical controller 17 shall apply signals Sig1(t) and Sig2(t) to the four electrodes 33, 35, 37, 39 in a manner such that voltages applied to the first and fourth electrodes 33, 39 for applying the first and second electrical high-frequency-modulated voltage signals Sig1(t), Sig2(t) have substantially the same first high-frequency content, and the voltages applied to the second and third electrodes 35, 37 for applying the first and second electrical high-frequency-modulated voltage signals Sig1(t), Sig2(t) have substantially the same second high-frequency content, which second high-frequency content is preferably significantly different from the first high-frequency content.

For example, high frequency modulated voltages, named herein V(S$_1$), V(S$_2$) of the signal lines S$_1$ and S$_2$ in the embodiment of FIG. 3, may be applied to the second and third electrodes 35, 37 whereas low frequency voltages or preferably constant voltages, named herein GND$_1$, GND$_2$ in the embodiment of FIG. 3, may be applied to the first and fourth electrodes 33, 39, or vice versa.

In such configuration, either the voltages applied to the first and fourth electrodes 33, 39 for applying the first and second electrical high-frequency-modulated voltage signals Sig1(t), Sig2(t) differ by a substantially constant voltage offset V$_{offset1}$, or, alternatively, the voltages applied to the second and third electrodes 35, 37 for applying the first and second electrical high-frequency-modulated voltage signals Sig1(t), Sig2(t) differ by a substantially constant voltage offset V$_{offset2}$.

In a preferred embodiment, the transmission line configuration is based on a co-planar architecture and comprises or preferably consists of two signal-electrodes S$_1$, i.e. second electrode 35, and S$_2$, i.e. third electrode 37, shielded by two GND-lines, i.e. first and fourth electrodes 33, 39 that are for example forced to ground-potential as depicted in FIG. 3. The voltages V(S$_1$), V(S$_2$) applied to S$_1$ and to S$_2$ both vary in the same direction, i.e., when the voltage V(S$_1$) applied to S$_1$ increases, the voltage V(S$_2$) applied to S$_2$ increases also, and vice-versa. This way S$_1$ and S$_2$ carry the same signal from an RF perspective, i.e. have the same high-frequency content, so that cross-talk is not an issue. Push-pull operation is obtained by flipping the polarity of one of the diodes 41, 43, relative to the conventional GS$\overline{S}$G-transmission line configuration, so that they are oriented in the same direction (e.g., pn-pn) rather than being symmetric relative to each other (e.g., pn-np) as in the case of the conventional GS$\overline{S}$G-transmission line configuration.

The same considerations may apply to the semiconductor-insulator(o)-semiconductor capacitors when the latter are used to implement the phase shifters 11, 13, i.e., pon-pon or nop-nop is implemented instead of pon-nop or nop-pon. The letter "o" is used to refer to the insulator, as the latter is often implemented by oxidizing a semiconductor or depositing a suitable dielectric.

In order to maintain high-speed operation of diode based phase shifters, the diodes 41, 43 included in the transmission line configuration should preferably never be driven into the forward bias regime by more than e.g. a few hundreds of mV, i.e. a voltage applied to the diode between its cathode and its anode (V$_{anode}$−V$_{cathode}$) should be negative or smaller than e.g. V$_{bmax}$=0.8V. A turn on voltage of a silicon diode is typically on the order of 0.7V to 0.8V. When a forward voltage larger than the turn on voltage is applied, a large forward current starts to flow and minority carriers are injected across the junction. This typically may result in a significant decrease of the device bandwidth and may limit high-speed operation. For this reason, forward biases should preferably remain below the turn on voltage for diode based phase shifters.

In order to obtain such voltage range, according to one embodiment, the voltage V(S$_2$) applied to S$_2$ is generated by subtracting a constant DC-voltage from the voltage V(S$_1$) applied to S$_1$ to ensure that the bias of the connected diode remains negative, i.e. blocking, or that a temporarily forward bias of the connected diode remains below a few hundreds of mV.

Thus, an identical bit-pattern with a voltage modulation swing V$_{mod}$ may be applied to both signal electrodes S$_1$ and S$_2$, while at the same time a (in this case negative) constant DC-offset voltage V$_{offset2}$ is added to S$_2$. The voltage applied to S$_1$ is in a range from V$_0$ to V$_{mod}$+V$_0$, with V$_0$>−0.8V for a diode based phase shifter (due to the orientation of the pn-junction a positive V(S$_1$) results here in a blocking diode voltage). The constant DC-offset voltage V$_{offset2}$ may typically be of magnitude −V$_{mod}$−2*V$_0$ so that V(S$_2$) may be in a range from −V$_{mod}$−V$_0$ to −V$_0$, resulting in push-pull operation with minimized chirp since the phase tuning ranges in both arms are then identical and the instantaneous applied phases ideally opposite to each other (relative to the median phase at the center of the phase tuning range). Particularly, an absolute value of the constant DC-offset voltage may be set to |V$_{offset2}$|>V$_{mod}$−2*V$_{bmax}$. V$_{mod}$ is typically in a range 0.5V to 7V. For state-of-the-art depletion or accumulation modulators, V$_{mod}$ is typically in a range 0.7V to 3.3V.

The voltage modulation swing is defined as the difference between the maximum voltage and the minimum voltage applied across a pn diode or a semiconductor-insulator-semiconductor capacitor. V$_{mod}$ may not only be the upper bound for the voltage modulation swing, but may be a voltage modulation swing that is actually reached for at least one of the two phase shifters 11, 13 of the electro-optical modulator, i.e., at least one of max(Sig1(t))−min(Sig1(t)) and max(Sig2(t))−min(Sig2(t)) reach V$_{mod}$.

The two signal-electrodes S$_1$ and S$_2$ may then be treated as a single signal electrode from a high frequency point of view. That means that impedance matching to a targeted impedance or phase matching to the photonic waveguides may be done like in a conventional GSG-transmission line by adjusting a gap between the signal lines and the adjacent GND-lines, the widths of the signal and ground lines and the thickness of the metallization layers while taking into account the capacitive loading of the transmission line. Since both signal lines are loaded with identical pn-diodes 41, 43, i.e., balanced loads, the RF-fields on the GS$_1$ side and on the S$_2$G side may automatically propagate with the same speed.

In contrast hereto, in a conventional GSG$\overline{S}$G-transmission line configuration the SG junction and the G$\overline{S}$ junction are either unloaded, leading to an unbalancing of the propagation velocities, or have to be loaded with dummy loads that increase the RF-losses by adding excess resistive losses. Dummy loads may be defined as pn diodes or semiconductor-insulator-semiconductor capacitors not embedded in a waveguide and thus not directly contributing to a phase shift of a guided light.

The advanced transmission line configuration proposed herein also necessitates the orientation of one of the two phase-modulator pn-diodes 41, 43 connected to the signal electrodes S$_1$ and S$_2$ to be reversed relative to the conventional devices described further above and shown in FIGS. 2a, 2b in order to ensure push-pull operation, i.e. one pn-diode has its anode connected to one of the signal lines S$_1$ or S$_2$, while the other pn-diode has its cathode connected to the other signal line S$_2$ or S$_1$.

While the conventional GS$\overline{S}$G configuration could be reconfigured into GSG$\overline{S}$ to also yield a structure in which the orientation of one of the pn diodes is switched, this remains a structure in which the second (S) and third electrode (G) have an entirely different high frequency content, as well as a structure in which the first (G) and the fourth electrode ($\overline{S}$) have an entirely different high frequency content, thus resulting in cross-talk limiting high speed operation. Furthermore, this results in a structure with suboptimal shielding as one of the external electrodes ($\overline{S}$) is not an RF ground.

Similar considerations hold in the case of phase shifters implemented with semiconductor-insulator-semiconductor capacitors. While forward biasing is not an issue here, it is desirable for the voltage ranges applied to both phase shifters 11 and 13 to be close, both to operate them in the most effective voltage range, as well as in order to maintain low chirp, push-pull operation. $V(S_1)$ may vary between $V_0$ and $V_{mod}+V_0$ and $V(S_2)$ may be set to $V(S_1)+V_{offset2}$ where $V_{offset2}$ may typically be set to $-V_{mod}-2*V_0$ in order to obtain low chirp push-pull operation. Since forward biasing is not an issue and even desirable for a phase shifter based on a semiconductor-insulator-semiconductor capacitor, $V_0$ may correspond here to a larger range of values. In particular, $V_0$ may be on the order of $-V_{mod}$ resulting in a mostly forward biased semiconductor-insulator-semiconductor capacitor operated in the carrier accumulation regime. For semiconductor-insulator-semiconductor based phase shifters, $V_{mod}$ is typically in a range 0.5V to 3.3V. Since semiconductor-insulator-semiconductor capacitor based phase shifters are more efficient when operated in forward bias, and thus typically operated primarily with a forward bias, applied reverse biases typically do not exceed 1V, i.e., $V_{mod}+V_0$ is typically smaller than 1V. In the case of a semiconductor-insulator-semiconductor capacitor, $V_{offset2}$ typically verifies $|V_{offset2}|V_{mod}-2*1V$.

In an alternative embodiment, instead of adding a positive or negative voltage $V_{offset2}$ to $S_2$, i.e. one of the inner signal electrodes 35, 37 as depicted in FIG. 3, one may add a voltage to an outer electrode, e.g., the rightmost ground electrode 39. It remains labeled as GND here, to indicate that it is an RF ground, i.e., remains at a DC-voltage. The resulting bias voltage applied to the rightmost diode 43 can be exactly the same than in the previous configuration, in particular this is the case if the opposite offset voltage is added to the outer electrode 39 as compared to the offset voltage added to the adjacent inner electrode 37 in the previous configuration. In particular, the same minimum values may also apply to $|Voffset_1|$ as previously described for $|Voffset_2|$. The signals may also remain exactly the same from an RF point of view. The only difference is that the necessity of a voltage-shifting device such as a bias-T is removed, since the rightmost ground line 39 could simply be connected to a positive supply voltage. A bias-T may be a device that allows combining a RF signal with a DC bias applied at two different terminals of the bias-T, and applying them jointly to a third terminal, in this case connected to an electrode of a phase-shifter. Not requiring a bias-T is particularly attractive for an integrated solution for which an on-chip implementation of a bias-T could be problematic, e.g. due to the required inductance. It may have the additional advantage that no negative voltages, i.e. below ground, have to be generated, again something that may be problematic in an integrated solution. The exact same considerations may apply to phase shifters implemented with semiconductor-insulator-semiconductor capacitors.

In this new driving configuration, it may be possible for $S_1$ and $S_2$ to carry exactly the same signal both from an RF and a DC point of view, so that they may be shorted with each other. In this case the transmission lines may be reduced to a single GS$\overline{G}$ structure, where $\overline{G}$ refers to the DC-shifted version of ground.

A major advantage of embodiments of this invention may be that the proposed transmission line configuration may be implemented in a single metal-layer co-planar technology even for devices operating at high data rates, e.g. in a Gbps-regime and above. That makes it cost effective and reduces fabrication process complexity while at the same time allowing for phase matching and suppressing cross-talk. However, aside from a co-planar implementation also more complex architectures including e.g. additional shielding in other metal-layers may be implemented.

In the following, possible voltage configurations to be applied to the two electrodes or signal lines 35, 37 and to the two electrodes or ground lines 33, 39 using the electrical controller 17 will be discussed with reference to various embodiments of the present invention.

A typical voltage configuration for a pn diode based implementation is for the two grounds lines 33, 39 to be at 0V, the first signal line 35 is set to $V(S_1)$ to vary between 0 and $V_{mod}$ (i.e., $V_0=0$) and the second signal line 37 is set to $V(S_2)$ to be equal to $V(S_1)-V_{mod}$. This may result in the pn diodes to be reverse biased with voltages between 0V and $-V_{mod}$ ($V_{anode}-V_{cathode}$).

A typical voltage configuration for a semiconductor-insulator-semiconductor based implementation is for $V(S_1)$ to vary between $-V_{mod}$ and 0 (i.e., $V_0=-V_{mod}$) and for the second signal line 37 to be set to $V(S_2)$ equal to $V(S_1)+V_{mod}$. This results in the semiconductor-insulator-semiconductor capacitors to be forward biased with voltages between 0V and $V_{mod}$ ($V_{anode}-V_{cathode}$).

It may be difficult or undesirable to drive $V(S_1)$ and $V(S_2)$ completely to zero, in which case for a pn-diode based implementation $V(S_1)$ may vary between $V_0$ and $V_0+V_{mod}$ and $S_2$ is driven to $V(S_1)-V_{mod}-2V_0$ with $V_0$ being set to $V_0>0$. Similar considerations apply to a semiconductor-insulator-semiconductor based implementation with $V_0+V_{mod}<0$.

In order to increase the modulation depth, it may be desirable to drive $S_1$ between a large positive voltage $V_{mod}+V_0$, for example corresponding to a connected diode 41 to be reverse biased, and a small negative voltage $V_0<0$, for example corresponding to the connected diode 41 to be slightly forward biased, but below the turn on voltage. In order to maintain high-speed operation with phase-shifters implemented with a pn diode, $|V_0|$ should not be larger than a few tens of mV or a few hundreds of mV for a negative $V_0$. For a silicon diode, the turn on voltage is for example on the order of 0.7V to 0.8V. In that case $S_2$ is also driven to $V(S_1)-V_{mod}-2V_0$. A slight forward bias may lead to an enhanced phase tuning. However, a substantial forward bias may also lead to an accumulation of minority carriers on either side of the pn junction, to a large diffusion capacitance and to a drastic reduction of the phase shifter bandwidth. A large forward bias should thus be avoided.

Similar considerations may apply to a semiconductor-isolator-semiconductor capacitor based implementation, e.g., by setting $V_0+V_{mod}>0$ (resulting in a temporarily reverse bias). A small reverse bias at one end of the voltage range may increase the phase tuning range. However, since the semiconductor-isolator-semiconductor capacitor is a less effective phase shifter in the depletion regime (negative bias) than in the accumulation regime (positive bias), it is typically desirable to primarily operate it with a forward bias.

As previously described, another preferred embodiment is a configuration where the left ground line 33 for $GND_1$ is set to 0, the right ground line 39 for $GND_2$ is set to $V_{mod}$ and the voltages $V(S_1)$ and $V(S_2)$ of the internal signal lines 35, 37 are varied between 0 and $V_{mod}$. In this case $V(S_2)$ is typically equal to $V(S_1)$ and the two signal lines $S_1$ and $S_2$, 35, 37, may be optionally shorted to each other, even optionally forming a single electrode. This results in reverse biased pn diodes. In order to operate semiconductor-isolator-semiconductor capacitors in accumulation, the voltages of electrodes 33 and 39 may be swapped, or the orientation of the semiconductor-isolator-semiconductor capacitors inverted.

In such embodiment, similar considerations hold as described above: The rightmost ground line 39 might be set to $V_{mod}+2V_0$ and $V(S_1)$ and $V(S_2)$ may be varied between $V_0$ and $V_{mod}+V_0$ (for both positive and negative $V_0$). However, forward biases (of magnitude $|V_0|$ when $V_0$ is negative) should be limited to a few tens or a few hundreds of mV when the phase shifters are implemented with a pn diode, thus it is then desirable to maintain $V_0$ above $-0.8V$.

Similar considerations may apply to implementations based on semiconductor-insulator-semiconductor capacitors. In order to operate semiconductor-isolator-semiconductor capacitors in accumulation, the voltages of the first electrode 33 may be set to 0V, the voltage of fourth electrode 39 may be set to $V_{mod}+2V_0$ and the voltages of the two inner electrodes 35,37 may be equal and vary between $V_0$ and $V_0+V_{mod}$. $V_0$ is then typically on the order of $-V_{mod}$. It might be desirable to maintain reverse biases above a few tens or a few hundreds of mV (reverse biases not exceeding a few hundreds of mV in absolute value) since they correspond to a less efficient voltage range, thus it is then desirable to maintain $V_0+V_{mod}$ below 1V. In these configurations, the offset voltage $V_{offset1}$ applied to the fourth electrode relative to the first electrode is $V_{mod}+2V_0$.

Finally, a combination of shifting the voltage of an outer electrode 33, 39, and of shifting the voltage of an inner electrode 35, 37 may be implemented.

In the previous paragraphs, embodiments with true RF ground lines were described. However, it is also possible to split $Sig1(t)$ and $Sig2(t)$ between the corresponding electrodes, respectively first and second electrodes 33, 35 and fourth and third electrodes 39, 37, in such a way that all four electrodes carry RF voltages. As previously, the spans of the voltage ranges (maximum voltage minus minimum voltage) applied across the diodes or Semiconductor-insulator-semiconductor capacitors may be substantially the same for both diodes 41, 43 or semiconductor-insulator-semiconductor capacitors, first electrodes 33 and fourth electrode 39 are substantially equivalent from a high-frequency point of view and second electrode 35 and third electrode 37 are substantially equivalent from a high frequency point of view.

A possible configuration is to drive the first electrode 33 between 0 and $V_{mod}/2$, the second electrode 35 between $V_{mod}/2$ and $V_{mod}$, the third electrode 37 between 0 and $V_{mod}/2$ and the fourth electrode 39 between $V_{mod}/2$ and $V_{mod}$. The voltages may then be varied between two extreme configurations corresponding to (0, $V_{mod}$, $V_{mod}/2$, $V_{mod}/2$) and to ($V_{mod}/2$, $V_{mod}/2$, 0, $V_{mod}$) respectively for the first, second, third and fourth electrode. This may be advantageous since the voltage controller 17 only needs to apply a voltage swing of $V_{mod}/2$ to any of the electrodes of the modulator. All intermediate configurations between applying the signals $Sig1(t)$ and $Sig2(t)$ only to one off the inner or outer electrode pairs to equally splitting them between the two electrode pairs are possible. However, if they are split between the two electrode pairs it may be desirable to substantially equally split them between the two electrode pairs, since this minimizes the voltage swing that needs to be applied by the voltage controller 17 to any of the electrodes. Typically, the spans of the voltage ranges (max voltage-min voltage) applied to the first, second, third and fourth electrode are all in the range $V_{mod}/2-0.5V$ to $V_{mod}/2+0.5V$, or in the range $V_{mod}/4$ to $3V_{mod}/4$. The voltages described in this paragraph result in a primarily reverse bias for a pn diode.

In order to obtain a primarily forward bias for semiconductor-insulator-semiconductor capacitors, the voltages of the four electrodes may be swapped (i.e. ($V_1$, $V_2$, $V_3$, $V_4$) into ($V_4$, $V_3$, $V_2$, $V_1$)) or the polarities of the semiconductor-insulator-semiconductor capacitors inverted.

As previously, the voltage of the second electrode 35 may vary between $V_0$ and $V_0+V_{mod}$ relative to the voltage of the first electrode 33 and the voltage of the third electrode 37 may vary between $-V_0-V_{mod}$ and $-V_0$ relative to the voltage of the fourth electrode 39.

It should be noted that this is also a situation in which the voltage offset $V_{offset}$ is split between and partially applied to both the pair of inner electrodes 35, 37 and the pair of outer electrodes 33, 39. In this general case, the total magnitude of the voltage offset is given by the voltage offset between the first and the fourth electrodes, referred to as $V_{offset1}$, minus the voltage offset between the second and the third electrodes, referred to as $V_{offset2}$, i.e., $V_{offset}=V_{offset1}-V_{offset2}$, since these two voltage offsets have opposite effects in regards to the biases of the phase shifters. In order for pn diodes to be primarily operated in reverse bias $|V_{offset1}-V_{offset2}|$ should be typically larger than $V_{mod}-2V_{bmax}$ and in order for semiconductor-insulator-semiconductor capacitors to be primarily forward biased $|V_{offset1}-V_{offset2}|$ should be typically larger than $V_{mod}-2*1V$. $|V_{offset1}-V_{offset2}|$ may be substantially equal to $|V_{mod}+2V_0|$.

As described in the previous paragraphs, it may be desirable for the voltage ranges applied across both diodes or semiconductor-insulator-semiconductor capacitors of the phase shifters 11, 13 to be exactly equal in order to obtain optimum push-pull operation with minimized chirp. As described previously, it is also desirable for the first and fourth electrodes 33, 39 to be exactly identical from a high frequency perspective, as well as for the second and third electrodes 35, 37 to be exactly identical from a high frequency perspective. However, this cannot always be guaranteed due to non-idealities of the voltage controller 17 or due to other reasons relating to the system or device architecture. Moreover, a certain deviation from these fixed relations may be admissible with an acceptably small reduction of device performance. In particular, in the case of an embodiment with two signal lines $S_1$ and $S_2$ and two ground lines, $V(S_2)$ may be set to $V(S_1)+V_{offset2,const}+V_{diff2}$, where $V_{offset2,const}$ is the idealized constant offset voltage as defined in the previous paragraphs (without the subscript const) and $|V_{diff2}|<0.5V$ or $|V_{diff2}|<V_{mod}/4$. $V_{diff2}$ may be a constant voltage, a slowly varying voltage, a high frequency voltage or a combination thereof. Under these conditions, the voltages applied to the second and to the third electrode may be considered to have substantially the same high-frequency content. In general and in particular in the case of an embodiment where all four electrodes carry a varying voltage, the voltages of the third and fourth electrodes may be set to $V_3=V_2+V_{offset2,const}+V_{diff2}$ and $V_4=V_1+V_{offset1,const}+V_{diff1}$, where $|V_{diff1}|<0.5V$ or $|V_{diff1}|<V_{mod}/4$, where $|V_{diff2}|<0.5V$ or $|V_{diff2}|<V_{mod}/4$, where $V_{offset1,const}$ is the idealized offset voltage of the fourth electrode relative to the first electrode as previously defined (without the subscript const) for various embodiments, where $V_{offset2}$ is the idealized offset voltage of the third electrode relative to the second electrode as previously defined (without the subscript const) for various embodiments, and where $V_1$, $V_2$, $V_3$ and $V_4$ are the voltages applied to the first, second, third and fourth electrode.

Under these conditions, the voltages applied to the second and to the third electrode may be considered to have substantially the same high-frequency content and the voltages applied to the first and to the fourth electrode may be considered to have substantially the same high-frequency content. $V_{diff1}$ and $V_{diff2}$ are also called difference voltages.

It shall be noted that several permutations of the electrode ordering are possible without changing the nature of the proposed transmission line configuration. For example, the ordering between the leftmost ground line, i.e., first electrode 33, the signal lines, i.e. second and third electrodes 35, 37 for $S_1$ and $S_2$ and the rightmost ground line, i.e., fourth electrode 39 may be inverted, if the orientation of the diodes 41, 43 is also inverted. The order of the signal lines, i.e. second and third electrodes 35, 37 for $S_1$ and $S_2$ may be inverted, if the orientation of the diodes 41, 43 is also inverted. The signal lines, i.e. second and third electrodes 35, 37 for $S_1$ and $S_2$ may be placed outside and the ground lines, i.e. first and fourth electrodes 33, 39 inside, if the orientation of the diodes 41, 43 is also flipped or if the signal lines or electrodes 35, 37 for $S_1$ and $S_2$ are also permutated with each other.

The same considerations also hold for phase shifters implemented with semiconductor-insulator-semiconductor capacitors, wherein flipping the order of electrodes combined with the associated inversion of the orientation of semiconductor-insulator-semiconductor capacitors results in the same biases being applied.

It should also be noted that while configurations for pn based phase shifters were converted into configurations for semiconductor-insulator-semiconductor capacitors by primarily adjusting the values of $V_{offset}$ and of $V_0$ while maintaining the geometry (orientation of the phase shifters) so as to maintain consistent definitions, configurations may also be adapted by simply swapping the orientation of the phase shifters (i.e. replacing anode with cathode and vice versa), or by swapping the voltages of the first, second, third and fourth electrode with the voltages of the fourth, third, second and first electrode, since both transform primarily reverse biases into primarily forward biases.

All the embodiments have following common characteristics: The two diodes 41, 43 or two semiconductor-insulator-semiconductor capacitors are oriented in the same direction, rather than being oriented in opposite but symmetric directions. From a high-frequency point of view the two inner electrodes or lines 35, 37 are substantially equivalent to each other. Furthermore, from a high-frequency point of view the two outer electrodes or lines 33, 39 are substantially equivalent to each other. Electrodes or lines 35, 37 or 33, 39 that are equivalent both from a high-frequency and a low frequency point of view may be shorted to each other. Diodes 41, 43 may be operated mostly in reverse bias. If they are partially operated in forward bias, this forward bias may not exceed a few tens or a few hundreds of mV. In order to ensure that the diodes 41, 43 are both mostly operated in reverse bias, or in order to ensure that the electro-optic modulator is operated in a low chirp regime, at least one electrode or line voltage in a pair of electrodes or lines 35, 37 or 33, 39 that are equivalent from an RF point of view has to be shifted by a DC voltage offset $V_{offset}$ relative to the other electrode or line of the pair. Similar considerations hold to ensure that phase shifters based on semiconductor-insulator-semiconductor capacitors both operate in an efficient voltage range and to ensure that low chirp operation is maintained.

Typical electrode (signal or ground lines) widths are in a range 1 µm-500 µm with a separation of 0.5 µm-500 µm between the two inner electrodes 35, 37. A gap between an inner electrode or signal line 35, 37 and an adjacent outer electrode or ground line 33, 39 is typically in a range of 0.5 µm-200 µm. Inner electrodes or lines may be shorted in some embodiments, in which case there may be no gap between them.

Geometry and Electrode Extension for Transmissions Line Configuration

Next, details on possible geometries applied in a transmission line configuration for an electro-optical modulator according to specific embodiments of the invention will be described. Particularly, details on electrode extensions for an advanced signal current flow scheme in such transmission line configuration will be described.

The waveguide 27 in FIG. 4 may be defined by etching into a semiconductor region 49. Electrodes or lines 23, 25 may contact the semiconductor region 49 in regions where the semiconductor region 49 is etched to the same depth as on either side of the waveguide 27 (i.e., as in the cladding of the waveguide 27). They may also contact the semiconductor region 49 in regions where the semiconductor region 49 has not been etched, or has been etched to a different depth. In particular, an etch into the semiconductor region 49 defining the cladding of the waveguide 27 may have finite extent, so that the electrodes 23, 25 may contact the semiconductor region 49 in a region where it is not etched but that remains outside of the core of the waveguide.

An electrical connection to the waveguide 27 constitutes a capacitive loading of the transmission lines 19 that modifies its intrinsic (unloaded) impedance and propagation velocity. For example, the capacitive loading may slow down the propagation velocity of the transmission line 19 and may be used to adjust it independently of the dielectric constants of the surrounding materials. Thus, this capacitive loading has to be taken into account when designing the device.

Due to an existing high resistivity of a current path between the metal electrodes 23, 25 and the waveguide 27, an electrical current tends to flow perpendicular to the main (i.e. longitudinal) axis of the transmission line 19 in this intermediate high-resistivity region, since this is the shortest path between the metal conductors of the electrodes 23, 25 and the waveguide. This may break a transverse electromagnetic (TEM) symmetry of the transmission line mode and explains why a propagation velocity of an electrical signal may be adjusted independently of the dielectric constant of the materials surrounding the transmission line. A distance between the metal lines forming the electrodes 23, 25 generally changes the ratio of the linear capacitance and the linear inductance of the unloaded transmission line 19 and, together with the capacitive load contributed by the pn-junction, may be used to adjust the phase velocity and impedance of the transmission line.

In a first approximation, the linear capacitance of the waveguide may be simply added to the linear capacitance of the unloaded transmission line in order to derive the properties of the loaded transmission line. This is a close approximation as long as the current flows perpendicular to the main longitudinal axis between the metal electrodes and the photonic waveguide. Typically, it is desirable to impedance match the transmission line to 50 Ohms in order to allow usage in conventional systems.

Apart from the capacitive load, the pn-diode also contributes a resistive load to the transmission line that causes RF-losses and degrades the amplitude of the RF-signal over propagation distance. A loss-figure α is calculated in dB/cm and the inverse of the loss figure determines the maximum useful length of a transmission line prior to being limited by excessive degradation of the RF signal strength.

Figure 5:
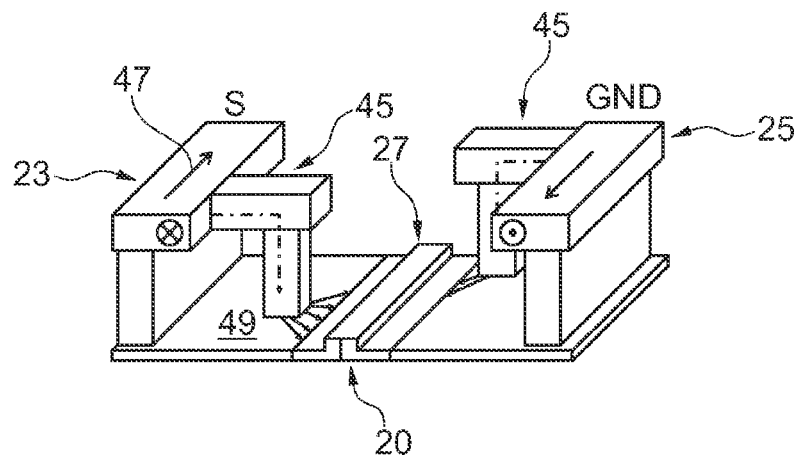
FIG. 5 shows a transmission line geometry including electrode extensions for an electro-optical modulator according to a specific embodiment of the present invention.

In conjunction with the previously described electrode configuration, the electro-optical modulator proposed herein may also comprise an advanced signal current flow scheme based on electrode extensions 45 between the electrodes 23, 25 and the pn diode 20 embedded in the waveguide 27 as shown in FIG. 5. The electrode extensions comprised in at least one of the first and second transmission lines 19 of the electro-optical controller extend transverse to a longitudinal direction of the transmission line and extend from one of the electrodes 23, 25 towards the pn junction 21 included in the semiconductor arrangement 49 of the respective transmission line. These electrode extensions 45 may comprise or consist of metal and may provide a low resistivity path between the main electrodes 23, 25 and the pn junction 21 embedded in the waveguide 27, while having a minimal impact on the impedance and propagation velocity of the loaded transmission lines 19.

The separation of signal lines and GND-lines may be chosen so as to obtain a self-inductance and self-capacitance required for achieving targeted transmission line impedance and targeted propagation velocity. This often results in a substantial distance between the lines/electrodes 23, 25, on the order of a few tens of microns. Since the current has normally to flow from the electrodes 23 (first electrode or signal line S) and electrode 25 (second electrode or ground line GND) to the pn junction 21 via doped semiconductor material of the semiconductor arrangement 49, this results in a substantial resistance and thus in substantial resistive losses of the RF-signal. Placing the electrodes 23, 25 closer to each other in order to reduce resistive losses may be problematic, since it would significantly change the impedance and propagation velocity of the transmission line.

To avoid signal degradation, electrode extensions 45 as depicted in FIG. 5 are added to the electrodes 23, 25 of, e.g., the signal- and the GND-lines. These electrode extensions 45 follow a path that is substantially perpendicular to the propagation direction of the RF-mode as indicated by the arrow 47. Typically, the extensions reach as close to the waveguide 27 as possible without introducing substantial losses for the optical mode. They may contact the slab of the ridge waveguide 27.

In this configuration, the signal current primarily flows through low resistivity metal of an electrode extension 45 instead of doped regions of the semiconductor arrangement 49, thus very effectively reducing RF-losses. The current flowing perpendicular to the propagation direction of the RF-mode does not contribute substantially to the self-inductance of the transmission line 19.

Electrode extensions 45 may be placed at regular or irregular intervals along the transmission line. To minimize a parasitic self-inductance and a parasitic capacitance induced by the electrode extensions 45, they are typically arranged in a way that the extensions 45 of one electrode 23 are not placed directly in front of the extensions 45 of the other electrode 25. In a regular arrangement, the electrode extensions 45 of the one electrode 23 could for example be offset by half the period relative to the electrode extensions 45 of the other electrode 25. In other words, electrode extensions 45 extend from each of the electrodes 23, 25 of a transmission line 19 in an alternating manner. In this configuration, extensions of opposing electrodes are separated by a maximized distance from each other, thus adding a minimum capacitive load and a minimum self-inductance.

Typical dimensions for the separation of the extensions of the same electrode are $w_{gap,ext}$=1 µm-100 µm (center to center) and for the width of the extensions are $w_{ext}$=0.5 µm-50 µm. In the region between the metal electrode and the end of the electrode extensions, i.e., the area with metal line extensions, the electrode extensions typically fill less than 50% of the chip, wafer or substrate area. Since the extensions are typically made out of a high conductivity material such as metal, they may fill less than 25% of the chip, wafer or substrate area in said region. Placing electrode extensions in an alternating manner is not restricted to placing them at half the period of the electrode extensions of the other electrode of an electrode pair 23, 25, nor is it restricted to periodic arrangements.

The extensions 45 may be fabricated primarily in the same metal layer as the electrodes 23, 25. However, in a multi-layer back-end-of-line process, the implementation could also involve other metal layers. As in the case of the primary electrodes 23, 25, the electrode extensions 45 may be placed directly onto the semiconductor region 49 or may be connected to the latter with vias.

The electrode extensions 45 may contact the semiconductor region 49 in regions where it is etched to the same depth as on either side of the waveguide 27 (i.e., as in the cladding region), as shown in FIG. 5, or they may contact the semiconductor region 49 in regions where it is not etched, or etched to a different depth.

As will understood to somebody skilled in the art, the electrode extensions may be applied to both electro-optical modulators with phase shifters based on pn diodes or with phase shifters based on semiconductor-insulator-semiconductor capacitors.

Here and elsewhere in this invention description, the word metal may also refer to highly conductive metal alloys, e.g., with resistivity lower than 1e-5 Ω*cm.

Advanced Pn-Diode Architecture with a Novel Highly-Doped Pn-Junction

Next, details on possible features and geometries of the pn diode 20 and its pn junction 21 as applied in a transmissions line configuration for an electro-optical modulator according to specific embodiments of the invention will be described. Particularly, details on dopant densities in such pn diode 20 and methods for forming such pn diodes will be described.

As indicated above, the electrically driven phase modulators 11, 13 may be advantageously implemented with reverse-biased pn-diodes 20, utilizing the free-carrier dispersion effect to convert an electrical signal provided by a control device 17 into an optical signal to be carried by the output light 2'. In such reverse-biased pn-diodes 20, a width of a space charge region (or depletion region) and a free carrier density in the space charge region may be varied depending on a reverse-bias, i.e. negative voltage applied to the pn-diode 20. At least parts of the pn-diode are formed such as to build a waveguide 27 guiding input light in a direction parallel to the pn junction 21 of the diode 20 or such that the pn junction 21 is at least partially located within the core of the waveguide 27. An effective index of the waveguide 27 is determined by an overlap integral of a propagating mode of the light with the regions of the waveguide 27 in which the density of free carriers is modulated. When the reverse voltage applied to the pn-diode is increased, the pn junction 21 will be further depleted of free carriers, thus the effective index of the waveguide 27 will increase, the phase velocity of the light decrease and a phase retardation will be applied to the cumulated phase of the propagating mode.

In such reverse-biased pn-diode 20, a higher doped pn-junction typically results in a larger modulation of the waveguide effective index per applied voltage or, conversely, in a lower reverse voltage change required for a given index modulation. This is due to the fact that the junction capacitance increases at higher doping levels, thus making it easier to inject or extract carriers. The higher carrier density more than compensates a decreased modulated width of the depletion region. However, optical losses due to free carrier absorption are also determined by the overlap integral of the propagating mode with the regions having free carriers, with higher carrier concentrations leading to higher optical losses. Thus, higher doping may result in higher optical losses. Finally, dopant concentrations impact the speed at which the width of the depletion region may be modulated, since the latter is ultimately limited by the transit time of the carriers given by the product of the drift velocity of the carriers (limited by the saturation velocity) and the width of the depletion region. Since a higher doping at the pn junction results in a thinner depletion region, it also results in a lower transit time and a higher limit to the maximum modulation frequency.

Application specific optimization of devices typically consists in finding a tradeoff between a high enough doping to meet requirements regarding transit time and drive voltage and a low enough doping to ensure acceptable optical losses, i.e. the optical insertion losses of the modulator.

Conventional, dopant implantation based fabrication techniques do not allow for sufficient control of the doping regions within the waveguide core 65 to introduce more than a single p-doped and a single n-doped region, making this trade-off a fundamental limitation of the waveguide design.

In a specific embodiment of the invention, the pn diode is provided with a specific dopant density distribution such as to overcome the design limitations associated to conventional pn-junctions, as typically formed with implantation.

Figure 7:
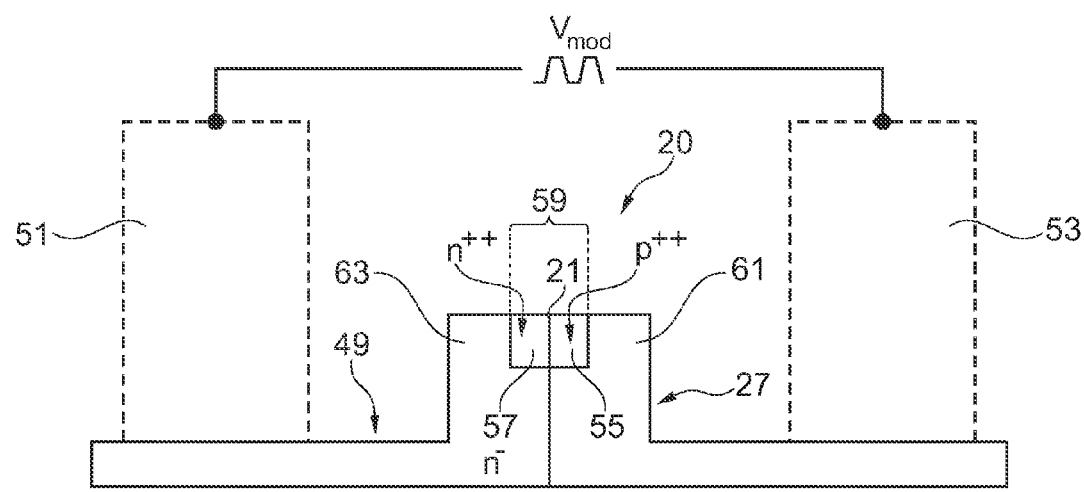
FIG. 7 shows an alternative pn diode architecture usable in an electro-optical modulator according to another specific embodiment of the present invention.
Figure 8:
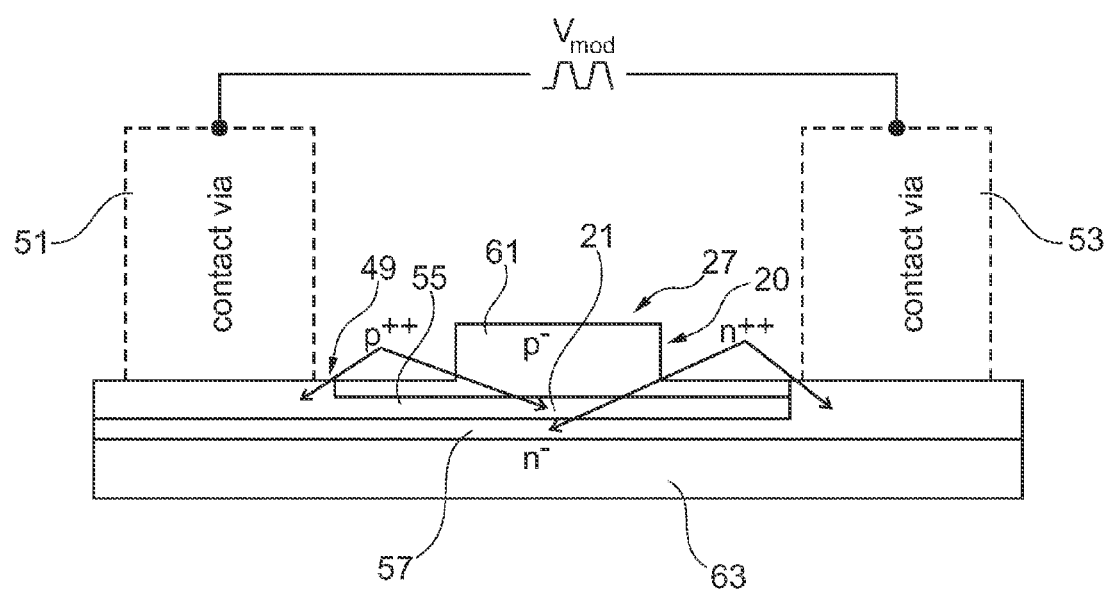
FIG. 8 shows a further alternative pn diode architecture usable in an electro-optical modulator according to another specific embodiment of the present invention.

In such embodiments, doping layers form an advanced pn-diode 20 as exemplary depicted in FIG. 6, 7 or 8. Therein, the pn diode 20 of the semiconductor arrangements 49 comprises a highly doped region 59 at least partially located within a core 65 of the waveguide with $p^{++}$ doped region 55 and $n^{++}$ doped region 57 directly adjacent to the pn junction 21 and furthermore comprises within a core 65 of the waveguide 27 moderately doped $p^-$ doped region 61 and $n^-$ doped region 63 distant from the pn junction 21.

The waveguide geometry is based on a ridge-waveguide design. Electrical contacts 51, 53 to the ridge waveguide 27 may occur from bottom and top as shown in FIG. 6 to allow for highest modulation performance, or may both occur through the bottom of the waveguide 27 as shown in FIG. 8, e.g., to allow for simplified and more cost effective fabrication procedures.

For the high performance contacting scheme of FIG. 6 with electrical contacts 51, 53 from the bottom and the top, a typical material for the top contact is amorphous, polycrystalline or crystalline silicon when the core 65 of the waveguide 27 is also fabricated out of silicon, i.e., in the case of Silicon Photonics. This contacting scheme typically has a higher modulation performance due to the fact that the pn-junction is restricted to a region within the ridge of the waveguide and the resulting capacitance is very small.

For the contacting scheme of FIG. 8 with both contacts 51, 53 coming through the bottom, the pn-junction 21 is not necessarily restricted to the region within the ridge of the waveguide 27 (as in FIGS. 6 and 7) but may extend well below the contact vias of the contacts 51, 53 (as in FIG. 8). Electrical contact to the $p^{++}$ and $n^{++}$ layers 55, 57 may be achieved by an additional implantation or diffusion of dopants underneath the contact vias of the contacts 51, 53 with dopants reaching sufficiently deep to provide electrical connectivity to the respective layer. Alternatively, or in conjunction with the deep implants/dopant diffusion, the semiconductor layer may also be partially etched below the vias contacting the deeper implant (n-type in FIG. 8).

Typical dimensions for a silicon waveguide 27 would be a waveguide width in a range $w_{WG} \sim 100$ nm to 10 µm and a waveguide height in a range $h_{WG} \sim 100$ nm to 5 µm.

A region 59 directly adjacent to the pn junction 21 itself is formed by highly doped $p^{++}$ and $n^{++}$ regions 55, 57, referred to as delta-doped regions in reference to the fact that these very highly doped regions 55, 57 only extend over a small region 59 on either side of the junction 21.

Ideally, the extent of these highly doped regions is chosen in a way that these regions 55, 57 are fully depleted when the maximum modulation voltage $V_{mod}$ is applied. This way, there is no excess highly doped region 59 that never gets depleted, thus not participating to index modulation but creating unnecessary optical losses. That means that the extent is on the order of the doping dependent depletion-width, but may also be smaller, larger and asymmetrical, i.e., different for the $n^{++}$ relative to the $p^{++}$ region. Typical dimensions for the delta-doped regions 55, 57 would be on the order of a width $w_{n++/p++} \sim 1$ nm to 100 nm. Typically, the thickness of the delta-doped regions would be less than 200% of a maximum depletion width. Typically, the thickness of the delta-doped regions would also be less than the maximum depletion width inside the delta doped region plus 100 nm (including excess width for both the $n^{++}$ and the $p^{++}$ regions).

The remaining parts of the waveguide 27 may be moderately n- and p-doped to ensure a high enough electrical conductivity for high-speed operation but to also minimize optical absorption losses due to free carriers. These parts are called the $n^-$ and $p^-$ doped regions 61, 63.

Typical values for the doping concentrations would be in the highly doped regions, 55, 57, 59: $p^{++}$ & $n^{++}$ in a range $1e18$ $cm^{-3}$ to $1e21$ $cm^{-3}$ and in the moderately doped regions 61, 63: $p^-$ & $n^-$ in a range $1e16$ $cm^{-3}$ to $1e19$ $cm^{-3}$.

Apart from an abrupt change in doping concentration from the moderately doped regions 61, 63 to the highly doped regions 59, graded doping profiles, i.e., gradually decreasing doping concentration from the delta-doping region to the moderately doped regions over a defined distance, may also be implemented. The boundaries between the $n^-$ and $n^{++}$, regions 61, 55 respectively between the $p^-$ and $p^{++}$ regions 63, 57, may be defined as the location where the dopant density reaches 20% of the peak density of the $n^{++}$ or $p^{++}$ regions 55, 57.

The orientation of the pn-diode 20 is preferably but not exclusively vertical as shown in FIGS. 6 and 8, i.e., the different doping regions 55, 57, 61, 63 are stacked layer by layer. In other words, semiconductor layers 55, 57, 61, 63 forming the pn diode 20 are arranged in horizontal planes parallel to a plane including the electrodes 23, 25.

This allows epitaxial growth of the different doping layers e.g. from a gas-phase using in-situ doping as the preferred method of fabrication. In-situ doping allows much more control over dopant concentration profiles than implantation. In particular, very thin doped regions with a thickness on the order of 1-100 nm may be achieved. Very thin doped layers of a few nm may in particular be deposited with an advanced technique called atomic layer deposition (ALD).

Alternatively, a lateral implementation as shown in FIG. 7 using e.g. ion-implantation to define the doping regions is conceivable. However, this would imply a modified configuration of the doping regions 55, 57, 61, 63 as depicted in FIG. 7. Here, the moderately doped regions 61, 63 are formed by coarse implantation and the delta doping regions 55, 57 are formed by over implanting using a shallow implantation technique with reduced implantation energies. Thus, the delta-doping regions 55, 57 do not fully extent through the whole waveguide 27. This configuration may be harder to fabricate, so that the in-situ doping remains the preferred fabrication method.

The location of the delta-doping region 59, especially the junction 21, i.e. a junction between the $p^{++}$- and the $n^{++}$-region 55, 57, may be typically located close to the middle of the waveguide 27, where the mode field has its highest overlap with the depletion region to gain the maximum effect of the free-carrier modulation. However, configurations with the junction displaced from the middle of the waveguide may be implemented and are also covered by this invention.

Finally, possible aspects and ideas underlying embodiments of the invention shall be summarized in a different wording as follows:

The invention relates to three major aspects of depletion type plasma modulators that are each a significant progress of the current state of the art of depletion type plasma modulators:

Advanced electrical transmission line configuration in combination with the diode connection scheme.

Electrode extensions for advanced signal current flow.

Advanced pn-diode architecture with a novel highly-doped pn-junction and a preferred fabrication with in-situ doping during epitaxy.

Especially a concurrent implementation of the three parts of the invention may be advantageous over current state-of-the-art solutions.

Main advantages of the invention may be inter alia:

The transmission line configuration may allow high-frequency operation by suppressing cross-talk between the signal lines while also allowing for a compact geometry and thus a high on-chip device density when more than one modulator is implemented, as the transmission lines may be located in close proximity to each other, and reduced transmission line losses resulting from efficient shielding. This transmission line geometry may be implemented with a single metallization layer, e.g. directly located on the semiconductor or connected to the latter with vias, resulting in low cost device fabrication.

The electrode extensions may allow placement of the electrodes in order to obtain targeted impedance and propagation velocity for the loaded transmission line, independently of concerns relating to transmission line losses occurring in the intermediate high resistivity region between the electrode and the waveguide, while at the same time providing a low resistivity current path between the electrodes and the photonic waveguide. Due to a segmented nature of the electrode extensions, they force the current to flow perpendicular to the main transmission line axis, thus providing a low resistivity current path while at the same time minimizing the impact on impedance and propagation velocity. Thus, they allow an independent adjustment of these quantities as determined by electrode placement. The signal line extensions may be implemented with a single metallization layer located on the semiconductor or connected to the semiconductor with vias, thus not adding any additional processing cost relative to the baseline technology. Reduced RF-losses due to the introduction of a high conductivity path between electrodes and waveguides may have in particular the benefit of enabling longer modulators with effective electrical driving. This way the drive voltage may be further reduced.

Definition of vertical pn junctions with in-situ doping during epitaxial growth or regrowth of the semiconductor may allow for ultra-precise tailoring of the dopant concentrations. In particular, it may allow for very high dopant concentrations in the immediate vicinity of the junction, while maintaining moderate or low implant concentrations elsewhere in the waveguide. Thus, acceptable optical losses may be realized at the same time as ultra-low drive voltage and ultra-short transit times.

It shall be noted that depletion type modulators have become the method of choice for implementing high-speed modulators in Silicon Photonics. For this reason, embodiments of the invention are not solely but also and especially applicable for silicon photonic systems. Alternatively, they may also be implemented with other semiconductor materials, such as InAlGaAs or InGaAsP material systems. All aspects of the invention may be applied to devices with long, phase matched transmission lines, or to devices with short signal lines behaving as lumped elements. In particular the vertical pn diode configuration is equally useful in both configurations.

Finally, it should be pointed out that the terms "comprise", "have", etc. should not rule out the presence of further additional elements. The term "a" or "one" does not exclude the presence of a plurality of elements or subject matters. The reference numbers in the claims solely serve the purpose of better readability and should not restrict the scope of protection of the claims in any manner.

LIST OF REFERENCE SIGNS 1 electro-optical modulator
2 light
3 light source
5 first modulator-arm
7 second modulator-arm
9 light splitting device
11 first electrically driven phase modulator
13 second electrically driven phase modulator
15 light recombination and interference device
17 control device
19 transmission line
20 pn diode
21 pn junction
23 first electrode/signal line
25 second electrode/GND line
27 waveguide
29 separating GND line
33 first electrode/ground line
35 second electrode/signal line
37 third electrode/signal line
39 fourth electrode/ground line
41 first diode
43 second diode
45 electrode extensions
47 propagation direction of the RF-mode
49 semiconductor region
51 contact
53 contact
55 highly doped p++ region
57 highly doped n++ region
59 highly doped region
61 moderately doped p− region
63 moderately doped n− region
65 core of the waveguide

The invention claimed is:

1. Electro-optical modulator for generating output high-frequency optical signals based on input high-frequency electrical signals, the electro-optical modulator comprising:
a first electrode;
a second electrode;
a third electrode;
a fourth electrode;
a first semiconductor arrangement including one of a first pn-diode and a first semiconductor-insulator-semiconductor capacitor and having an anode electrically connected to the first electrode and having a cathode electrically connected to the second electrode and forming a first optical waveguide comprising one of a first pn-junction of the first pn-diode and a first semiconductor-insulator interface of the first semiconductor-insulator-semiconductor capacitor, respectively;

a second semiconductor arrangement including one of a second pn-diode and a second semiconductor-insulator-semiconductor capacitor and having an anode electrically connected to the third electrode and having a cathode electrically connected to the fourth electrode and forming a second optical waveguide comprising one of a second pn-junction of the second pn-diode and a second semiconductor-insulator interface of the second semiconductor-insulator-semiconductor capacitor, respectively;

an electrical controller adapted for applying a first voltage $V_1$ to the first electrode and a second voltage $V_2$ to the second electrode for generating a first electrical high-frequency-modulated voltage signal Sig1($t$) between the first and the second electrode and for applying a third voltage $V_3$ to the third electrode and a fourth voltage $V_4$ to the fourth electrode for generating a second electrical high-frequency-modulated signal Sig2($t$) between the fourth and third electrode, wherein a high-frequency content of each one of the voltages $V_1$, $V_2$, $V_3$, $V_4$ applied to one of the electrodes corresponds to Fourier components with frequencies above 1 GHz, wherein voltages $V_1$, $V_4$ applied to the first and fourth electrodes for applying the first and second electrical high-frequency-modulated voltage signals Sig1($t$), Sig2($t$) have substantially a same high-frequency content, and wherein the voltages $V_2$, $V_3$ applied to the second and third electrodes for applying the first and second electrical high-frequency-modulated voltage signals Sig1($t$), Sig2($t$) have substantially a same high-frequency content, wherein at least one of the voltages applied to the first and fourth electrodes for applying the first and second electrical high-frequency-modulated voltage signals Sig1($t$), Sig2($t$) differ by a first voltage offset $V_{offset1}$ with $V_{offset1} = V_{offset1,const} + V_{diff1}$ with $V_{offset1,const}$ being constant and non-zero and $|V_{diff1}| < 0.5V$, and the voltages applied to the second and third electrodes for applying the first and second electrical high-frequency-modulated voltage signals Sig1($t$), Sig2($t$) differ by a second voltage offset $V_{offset2}$ with $V_{offset2} = V_{offset2,const} + V_{diff2}$ with $V_{offset2,const}$ being constant and non-zero and $|V_{diff2}| < 0.5V$.

2. The electro-optical modulator of claim 1, wherein the first and fourth electrodes are a pair of RF ground lines each being set by the electrical controller to a constant voltage and wherein the second and third electrodes are a pair of signal lines each being set by the electrical controller to a high-frequency modulated voltage for applying the first and second electrical high-frequency-modulated voltage signals Sig1($t$), Sig2($t$), wherein the four electrodes are arranged next to each other such that one of the pair of ground lines and the pair of signal lines is arranged as inner electrode pair with electrodes neighbouring each other and the other of the pair of ground lines and the pair of signal lines is arranged as outer electrode pair with electrodes enclosing the electrodes of the inner electrode pair.

3. Electro-optical modulator of claim 2, wherein the first electrode is set to a first constant voltage $V_1 = GND1$, wherein the fourth electrode is set to a second constant voltage $V_4 = GND2$, wherein the second voltage $V_2$ is modulated with signal Sig1($t$) in a modulation range from $V_0$ to $(V_0 + V_{mod})$ relative to the first constant voltage GND1, wherein the third voltage $V_3$ is modulated with signal Sig2($t$) relative to the second constant voltage GND2, and wherein one of the third voltage $V_3$ is modulated in a modulation range from $V_0$ to $(V_0 + V_{mod})$ relative to the first constant voltage GND1, with $V_{mod}$ being a voltage modulation swing and $V_{mod} > 0$, with $V_0$ being a constant voltage, wherein GND2 is offset from GND1 by the first offset voltage $V_{offset1}$, and the third voltage $V_3$ is modulated in a modulation range from $-(V_{mod} + V_0)$ to $-V_0$ relative to the first constant voltage GND1, with $V_{mod}$ being a voltage modulation swing and $V_{mod} > 0$, with $V_0$ being a constant voltage, wherein GND2 is set equal to GND1 wherein $V_3$ is offset from $V_2$ by the second offset voltage $V_{offset2}$.

4. Electro-optical modulator of claim 1, wherein non-zero high-frequency voltage contents are applied to all four of the first, second, third and fourth electrode, wherein $V_2 - V_1$ varies between $V_0$ and $V_0 + V_{mod}$, wherein $V_3 - V_4$ varies between $-V_0 - V_{mod}$ and $-V_0$, wherein $V_{mod}$ is a voltage modulation swing and $V_{mod} > 0$, wherein $V_0$ is a constant voltage, wherein one of spans of voltage ranges applied to the first, second, third and fourth electrode are all within $V_{mod}/4$ to $3V_{mod}/4$, and spans of voltage ranges applied to the first, second, third and fourth electrode are all within $V_{mod}/2 - 0.5V$ to $V_{mod}/2 + 0.5V$, wherein the second voltage offset $V_{offset2}$ is applied to the third electrode relative to the second electrode and the first voltage offset $V_{offset1}$ is applied to the fourth electrode relative to the first electrode.

5. The electro-optical modulator of claim 3, wherein the first and second semiconductor arrangements comprise a first and a second pn diode, wherein $V_0 > -0.8V$, and wherein $|V_{offset1,const}| > V_{mod} - 1.6V$ and $|V_{offset2,const}| > V_{mod} - 1.6V$.

6. The electro-optical modulator of claim 4, wherein the first and second semiconductor arrangements comprise a first and a second pn diode, wherein $V_0 > -0.8V$, and wherein $|V_{offset2,const} - V_{offset1,const}| > V_{mod} - 1.6V$.

7. The electro-optical modulator of claim 3, wherein the first and second semiconductor arrangements comprise a first and a second semiconductor-insulator-semiconductor capacitor, wherein $V_0 + V_{mod} < 1V$, and wherein $|V_{offset1,const}| > V_{mod} - 2V$ and $|V_{offset2,const}| > V_{mod} - 2V$.

8. The electro-optical modulator of claim 4, wherein the first and second semiconductor arrangements comprise a first and a second semiconductor-insulator-semiconductor capacitor, wherein $V_0 + V_{mod} < 1V$, and wherein $|V_{offset2,const} - V_{offset1,const}| > V_{mod} - 2V$.

9. The electro-optical modulator of claim 3, wherein $|V_{offset1,const}|=|V_{offset2,const}|=|V_{mod}+2V_0|$ and wherein at least one of $\max(\text{Sig1}(t))-\min(\text{Sig1}(t))$ and $\max(\text{Sig2}(t))-\min(\text{Sig2}(t))$ is equal to $V_{mod}$.

10. The electro-optical modulator of claim 4, wherein $|V_{offset2,const}|-|V_{offset1,const}|=|V_{mod}+2V_0|$ and wherein at least one of $\max(\text{Sig1}(t))-\min(\text{Sig1}(t))$ and $\max(\text{Sig2}(t))-\min(\text{Sig2}(t))$ is equal to $V_{mod}$.

11. The electro-optical modulator of claim 3, wherein $|V_{diff1}|<V_{mod}/4$ and $|V_{diff2}|<V_{mod}/4$.

12. The electro-optical modulator of claim 4, wherein $|V_{diff1}|<V_{mod}/4$ and $|V_{diff2}|<V_{mod}/4$.

13. Electro-optical modulator of claim 1, wherein the first and second electrodes and the first semiconductor arrangement form a first transmission line and wherein the third and fourth electrodes and the second semiconductor arrangement form a second transmission line.

14. Electro-optical modulator of claim 13, wherein at least one of the first and second transmission lines comprises electrode extensions extending transverse to a longitudinal direction of the transmission line and extending from one of the electrodes towards one of a pn junction and a semiconductor-insulator junction included in the semiconductor arrangement of the at least one transmission line.

15. Electro-optical modulator of claim 14, wherein electrode extensions extend from each of the electrodes of a transmission line in an alternating manner.

16. Electro-optical modulator of claim 1, wherein the first and second semiconductor arrangements comprise a first and second pn diode with a first and second pn junction, respectively,
wherein the pn diode of at least one of the first and second semiconductor arrangements comprises a highly doped region with $p^{++}$ doped regions and $n^{++}$ doped regions directly adjacent to the pn junction and furthermore comprises within a core of the waveguide moderately doped $p^-$ doped regions and $n^-$ doped regions distant to the pn junction.

17. Electro-optical modulator of claim 16, wherein semiconductor layers forming the pn diode are arranged in horizontal planes parallel to a plane including the electrodes.

18. Electro-optical modulator of claim 16, wherein the pn junction comprises layers formed by epitaxy.

* * * * *